United States Patent [19]

Bryngdahl

[11] 3,873,207

[45] Mar. 25, 1975

[54] POLARIZING INTERFEROMETER

[75] Inventor: Olof Bryngdahl, Cupertino, Calif.

[73] Assignee: Xerox Corporation, Stamford, Conn.

[22] Filed: Mar. 9, 1973

[21] Appl. No.: 339,672

[52] U.S. Cl................. 356/106 R, 356/114, 350/14
[51] Int. Cl. ............................................ G01b 9/02
[58] Field of Search ........ 356/106, 114; 350/12, 13, 350/14, 15, 157

[56] References Cited
UNITED STATES PATENTS
| 2,924,142 | 2/1960 | Nomarski | 350/13 |
| 3,382,761 | 5/1968 | Dyson | 356/106 |
| 3,628,848 | 12/1971 | Nomarski | 350/13 |

OTHER PUBLICATIONS
Fundamentals of Optics, Jenkins and White, pp 517–518, McGraw–Hill, 1957.

Primary Examiner—Ronald L. Wibert
Assistant Examiner—Conrad Clark

[57] ABSTRACT

The invention relates to a polarizing interferometer which allows for the shift in the location of the interferogram fringes. At least a pair of polarizers are located in the optical path from the object to the interferogram plane between which is an imaging lens, a beam splitter, and a quater-wave plate. Interferograms are imaged onto an image plane of the object by this interferometer. The use of the quarter-wave plate allows the production of interferograms in the image plane regardless of the rotational positioning of the second polarizer in relation to the first. If monochromatic light illuminates the object and the second polarizer which follows the quarter-wave plate is rotated, then fringes in the interferogram are continuously moved to new positions. If white light illuminates the object and no fringes are present in the image plane, hypersensitive interference colors may be developed in the image plane by substituting a Fresnel rhomb for the quarter-wave plate.

16 Claims, 1 Drawing Figure 3,873,207
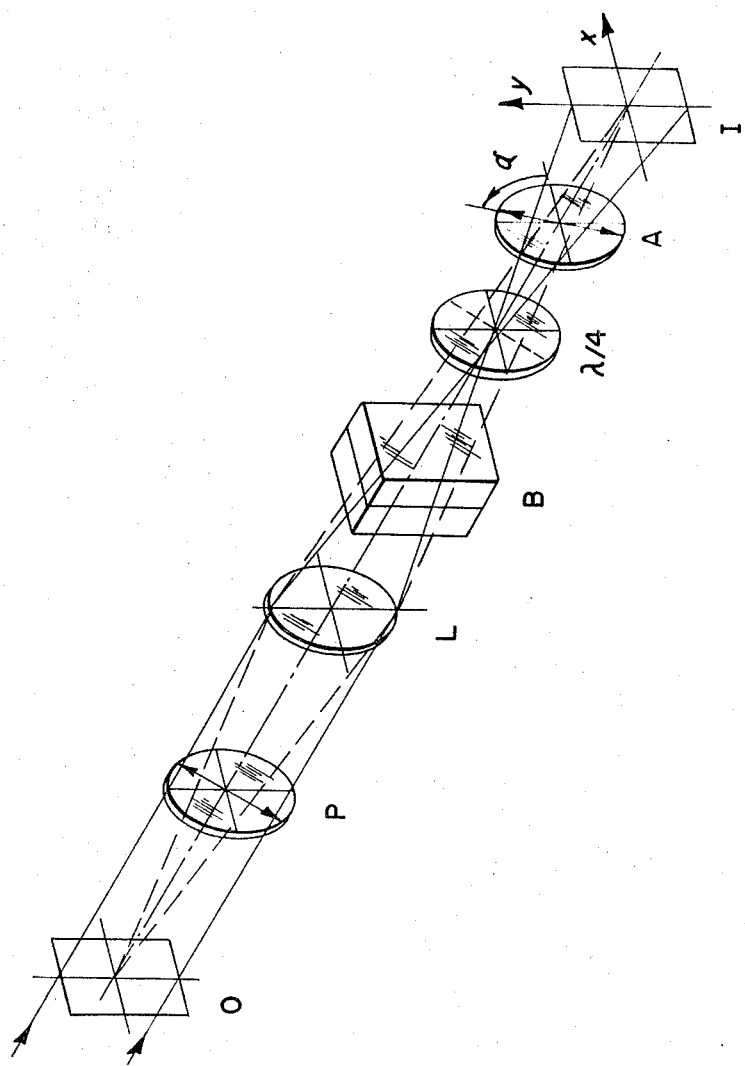

POLARIZING INTERFEROMETER

BACKGROUND

This invention relates to a method and apparatus for forming interferogram fringes by means of an interferometer, and more particularly to such fringe formation resulting from the use of a polarizing interferometer.

Fringes are typically associated with interferograms which are displayed by an interferometer, which aid in the use of an interferometer as a measuring instrument. The sensitivity of an interferometer as a part of a measuring system may be optimized by shifting the location of the fringes of an interferogram. Also, by shifting the location of the fringes, one may also observe the sign of the phase variation over the object. In conventional interferometry, the fringes are moved by changing the relative phase between the interfering waves which produce the interferogram. The relative phase may be changed either by rotating a plane parallel plate around an axis perpendicular to the optical axis, translating a mirror perpendicular to its surface, or translating a wedge or grating beam splitter in its own plane. Another class of fringe shifters which provides a polarization modulated interferometer output. This is achieved by rotating a polarizing filter around the optical axis in order to reposition any desired amount of fringe, provided that the phase variations due to the object details are converted into a polarization direction variation of linearly polarized light. In any interferometer where the interfering waves are orthogonally circularly polarized, this kind of modulation occurs. This same concept is applied to polarization interferometers. In such interferometers, the wave which is deformed by the phase variations in the object is sheared by a double-refracting system and the two waves are made to interfere by using a polarizer in front and another polarizer behind the shearing system. The fringe shifting procedure above may easily be applied to this type of interferometer.

In the prior art embodiments, however, the second polarizer, or analyzer, must be aligned either in parallel or orthogonal to the first polarizer to produce an interferogram with fringes or colors of the Newton color scale. It is obvious that to remove such constraints the use of an interferometer as a practical system would be enhanced.

It is thus an object of the present invention to provide a polarization interferometer which provides for interferograms without such constraints.

It is a further object of the present invention to form fringes by using a polarization interferometer which may easily be controlled to provide for fringe shifting.

It is yet another object of the present invention to control the shifting of the location of fringes displayed by an interferometer by introducing a quarter-wave plate between the polarizer and analyzer of the interferometer.

It is still another object of the present invention to provide an interferometer which gives additional interferogram colors which are more sensitive than that of the Newton color scale.

Other objects of the invention will be evident from the description hereinafter presented.

SUMMARY OF THE INVENTION

The invention provides a polarization interferometer which allows for the shifting of fringes of an interferogram and also for the production of hypersensitive interference colors, when an object in the optical path of the interferometer is illuminated by spatially coherent white light. The polarization interferometer of the invention is comprised of two polarizers superposed in an optical path with the object and a lens, beam splitter, and quarter-wave plate in optical alignment with and between the two polarizers. The lens images the object onto an image plane, while the beam splitter provides for the necessary splitting of the light wave from the object into two optical waves.

An important feature of the invention is that aa Senarmont compensator, e.g., a quarter-wave plate, is introduced between the first polarizer and an analyzer, the second polarizer. In monochromatic light, if an interferogram is displayed containing fringes, the fringes may be shifted by the mere rotation of the compensator.

Another feature of the invention is that in white light, hypersensitive internference colors are displayed in the image plane. Since this new color scale is much more sensitive than that of the Newton color scale, one may achieve more precise measurements through the use of the interferometer.

These and other features which are considered to be characteristic of this invention are set forth with particularity in the appended claims. The invention itself, however, as well as additional objects and advantages thereof, will best be understood from the following description when considered in conjunction with the accompanying drawing.

BRIEF DESCRIPTION OF THE DRAWING

The FIG. is a schematic drawing of the interferometer which embodies features of the invention.

DESCRIPTION OF THE PREFERRED EMBODIMENT

In the figure is shown a polarizing interferometer in accordance with the invention. An object is located in an object or source plane O and illuminated by collimated light. A first polarizer P is located proximate the source plane O and a second polarizer or analyzer A is located proximate an image plane I. Between the polarizer P and the analyzer A are a lens L, a beam splitter B, and a compensator or quarter-wave ($\lambda/4$) plate in optical alignment with the polarizer P and the analyzer A. The polarizer P may be any polarizer, such as a polaroid filter, and the analyzer A is but a second polarizer of the same design as the polarizer P. The lens L is an imaging lens which images the object in plane O onto the plane I to form an interferogram in which fringes or colors may be formed. The beam splitter B may be any prior art beam splitter, such as a birefringent plate which splits the light wave from the object into two optical waves. The two resulting waves are imaged through the $\lambda/4$ plate and the analyzer A to the image plane I.

The element identified as a $\lambda/4$ plate may be any Senarmont compensator. For example, if the object is illuminated by white light, the use of a Fresnel rhomb is contemplated.

In general, the superposition of two orthogonal linear polarization states results in elliptically polarized light including the special cases of linearly polarized light for a phase difference of zero and $\pi$ and circularly polarized light for $\pm\pi/2$ phase difference and equal amplitudes. By introducing the Senarmont compensator, λ/4 plate, elliptically polarized light is converted into linearly polarized light provided the axes of the λ/4 plate coincide with those of the ellipse. The two orthogonally linearly polarized waves internal to the interferometer of FIG. 1 are converted into a right-and left-circularly polarized wave, respectively, by the λ/4 plate with its fast axis bisecting the directions of the linear components. Thereby, the two circular polarization states combine into a linear polarization. Rotation of the linear analyzer A will then cause the fringes displayed by an interferogram to continuously move to new positions.

In principle, any pair of orthogonal states could be used. However, it is preferred that circular and linear polarization states be used since they are easy to produce and detect. This approach in shifting the location of the fringes of an interferogram also makes possible the determination of the sign of the phase variation or gradient over the object. For example, if the object is replaced in portion of the interferometer in which the light is right circularly polarized, then the fringes will move toward decreasing phase values with an increasing $\alpha$ by the rotation of the analyzer A in the figure. A half a rotation of the analyzer A has been found to correspond to a fringe movement equal to the distance between neighboring fringes ($2\pi$ phase change).

One of the major advantages of the invention is that the movable element, the analyzer A, is placed in a common path of the two interfering waves, which lessens the requirement in terms of adjustment and optical quality of any optical element which would be employed for fringe shifting. Another significant advantage of the invention is the linear relationship which exists between the angle of rotation and the resulting fringe shift, which relationship simplifies any necessary calibration.

The invention may also be practiced on other types of interferometers than that described in this preferred embodiment.. Several possibilities for combinations exist, as a λ/2 plate may interchange between orthogonal linear as well as circular polarization states. Of course, a reflection would also interchange right- and left-circularly polarized light. Thus, it is possible to employ Michelson-type and Cyclic-type arrangements. Polarizing beam splitters such as the beam splitter B, are important in this application because they provide under certain polarization conditions two waves propagating in different directions to be combined and brought to the same direction without diverting any light into extraneous directions. The λ/4 plate may even be cemented onto the beam splitter in more permanent instruments.

If achromatic or white light is used to illuminate the object in the source plane O, it is contemplated that the 80 /4 plate is achromatic as, for example, a Fresnel rhomb. If fringes are in the image plane I, the rotation of the analyzer A will then cause these fringes to move. The fringes may move over the image plane from a washed out condition, then become better defined and more saturated, until it approaches a black appearance around the zero path difference. Then, the fringe will again turn somewhat saturated and finally become more and more washed out. on the other hand, if a particular point in the interferogram is observed, variation in color occurs when we rotate the analyzer. For example, a point corresponding to zero phase difference will vary alternately between black, with crossed polarizers, and white, with parallel polarizers, and display grey in between. Such color changes are provided by merely varying the angle $\alpha$ between the polarizer P and the analyzer A. This condition is to be compared with the prior art systems which can only provide colors of the Newton color scale by setting the polarizer and analyzer either parallel or orthogonal to one another. The λ/4 plate or Fresnel rhomb allows the rotation of the analyzer A from the two alignment conditions of the prior art systems. It is this deviation from the polarizer positioning requirements, through the introduction of a compensator, which reveals a new color scale. For measurements applications, one may achieve higher precision in that the sensitivity of the new color scale provides for measurements down to 2 A whereas, prior art systems have a precision to only 5 A.

In the general situation of the object being illuminated by monochromatic light, it should be emphasized that the positional restraints of the polarizers with respect to each other in the prior art systems prevents any shifting of the position of fringes of an interferogram through the rotation of the polarizers with respect to one another. It is this freedom from the polarizer positional constraints of the prior art systems, provided by the introduction of the Senarmont compensator, which makes the above features possible.

Of course, one may also adjust apparatus in accordance with the invention so that any combination of phase difference and polarization direction difference can be achieved. Obviously, many modifications of the present invention are possible in light of the above teaching. It is therefore to be understood that, in the scope of the appended claims, the invention may be practiced other than as specifically described.

What is claimed is:

1. Apparatus for producing interferograms which have hypersensitive colors in an image plane from an illuminated object comprising:

means for illuminating said object with achromatic light, means for polarizing the illumination from said object, said polarizing means being positioned in the optical path between said object and said image plane, means for splitting said illumination into at least two beams of light directed toward said image plane, means for imaging said illumination such that said beams interfere with one another to produce an interferogram in said image plane, and achromatic optical means for converting the polarized illumination into linearly polarized illumination prior to the formation of said interferogram.

2. The apparatus as defined in claim 1 wherein said optical means is a Senarmont compensator.

3. The apparatus as defined in claim 2 wherein said polarizing means comprises at least two polarizers, one of which is disposed in the optical path to function as an analyzer.

4. The apparatus as defined in claim 3 wherein said compensator is an achromatic quarter-wave plate disposed between said polarizers in optical alignment with said polarizers.

5. The apparatus as defined in claim 4 wherein said compensator is angularly displaced from said polarizers at an angle different from 0° or 90°.

6. A method of producing interferograms which have hypersensitive colors in an image plane from an illuminated object comprising the steps of:
illuminating said object with achromatic light to provide a beam of light toward said image plane,
polarizing the beam from said object,
splitting said beam into at least two beams of radiation directed toward said image plane,
imaging said light beam such that said beams interfere with one another to produce an interferogram in said image plane, and
compensating said directed light prior to the formation of said interferogram by further imaging said light beam with an achromatic compensator.

7. The method of claim 6 wherein said compensating step comprises positioning an achromatic quarter-wave plate in the optical path between said object and said image plane.

8. The method of claim 7 wherein is further included the step of rotating said plate to provide varying interferogram fringe positions dependent upon the angular position of said plate.

9. Apparatus for producing interferograms which have hypersensitive colors in an image plane from an illuminated object comprising:
means for illuminating said object with achromatic light;
a first polarizer disposed in the optical path between the object and the image plane;
means for splitting the illumination from said object into at least two beams of light directed toward said image plane,
said splitting means disposed in the optical path between said first polarizer and said image plane;
a second polarizer disposed in the optical path between said splitting means and said image plane;
means for imaging said illumination such that said beams interfere with one another to produce an interferogram in said image plane; and
an achromatic quarter-wave plate disposed in the optical path between said polarizers.

10. The apparatus as defined in claim 9 wherein said second polarizer functions as an analyzer.

11. The apparatus as defined in claim 9 wherein said plate is angularly displaced from said polarizers at an angle different from 0° or 90°.

12. Apparatus for producing interferograms which have hypersensitive colors in an image plane from an illuminated object comprising:
means for illuminanting said object with achromatic light;
a first polarizer disposed in the optical path between the object and the image plane;
means for splitting the illumination from said object into at least two beams of light directed toward said image plane,
said splitting means disposed in the optical path between said first polarizer and said image plane;
a second polarizer disposed in the optical path between said first polarizer and said image plane;
means for imaging said ilumination such that said beams interfere with one another to produce an interferogram in said image plane; and
an achromatic quarter-wave plate disposed in the optical path between said polarizers,
said plate being angularly displaced from said polarizers at an angle different from 0° or 90°.

13. The apparatus as defined in claim 12 wherein said second polarizer functions as an anlyzer.

14. A method of producing interferograms which have hypersensitive colors in an image plane from an illuminated object comprising the steps of:
iluminating said object with achromatic light to provide a beam of light toward said image plane,
polarizing the beam from said object with a pair of polarizers,
splitting said beam into at least two beams of radiation directed toward said image plane,
imaging said light beam such that said beams interfere with one another to produce an interferogram in said image plane,
compensating said directed light prior to the formation of said interferogram by further imaging said light beam with an achromatic compensator, and
positioning said compensator between said polarizers at an angular displacement different from 0° or 90°.

15. The method of claim 14 wherein said compensating step comprises positioning an achromatic quarter-wave plate in the optical path between said object and said image plane.

16. The method of claim 15 wherein is further included the step of rotating said plate to provide varying interferogram fringe positions dependent upon the angular position of said plate.

* * * * *